(12) United States Patent
Suzuki et al.

(10) Patent No.: US 11,409,282 B2
(45) Date of Patent: Aug. 9, 2022

(54) CONTROL SYSTEM FOR MOVABLE BODY, CONTROL METHOD FOR MOVABLE BODY, AND NON-TRANSITORY STORAGE MEDIUM

(71) Applicant: SUBARU CORPORATION, Tokyo (JP)

(72) Inventors: Kei Suzuki, Tokyo (JP); Masahito Hayakawa, Tokyo (JP); Masato Ogura, Tokyo (JP); Yuichi Nagai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 672 days.

(21) Appl. No.: 16/241,328

(22) Filed: Jan. 7, 2019

(65) Prior Publication Data
US 2019/0302765 A1 Oct. 3, 2019

(30) Foreign Application Priority Data
Mar. 29, 2018 (JP) .............................. JP2018-063433

(51) Int. Cl.
*G05D 1/00* (2006.01)
*B64C 39/02* (2006.01)

(52) U.S. Cl.
CPC ......... *G05D 1/0077* (2013.01); *B64C 39/024* (2013.01); *G05D 1/0088* (2013.01); *B64C 2201/126* (2013.01); *B64C 2201/141* (2013.01)

(58) Field of Classification Search
CPC .. G05D 1/0077; G05D 1/0088; B64C 39/024; B64C 2201/126; B64C 2201/141; B64C 13/16; B64D 13/00; B64D 31/06
See application file for complete search history.

(56) References Cited

U.S. PATENT DOCUMENTS

2012/0297108 A1  11/2012 Mitani et al.
2013/0145482 A1*  6/2013 Ricci ..................... B60W 40/08
726/28

(Continued)

FOREIGN PATENT DOCUMENTS

JP         8-179949 A    7/1996
JP      2011-126359 A    6/2011
(Continued)

OTHER PUBLICATIONS

Notice of Reasons for Refusal issued in corresponding Japanese Patent Application No. 2018-063433 dated Dec. 3, 2019, with machine translation.

*Primary Examiner* — Navid Z. Mehdizadeh
(74) *Attorney, Agent, or Firm* — Troutman Pepper Hamilton Sanders LLP

(57) ABSTRACT

A control system for a movable body is mountable on the movable body. The control system includes controllers and a detector. The controllers are configured to control functional systems of the movable body. The detector is configured to detect a movement situation of the movable body. Priorities corresponding to movement situations of the movable body are in advance assigned to each of the plurality of functional systems. When at least one of the plurality of controllers malfunctions, control resources of normal controllers, among the plurality of controllers, which do not malfunction are preferentially distributed to one or more of the functional systems having a high priority according to the movement situation of the movable body at that time.

8 Claims, 3 Drawing Sheets

| FLIGHT PURPOSE | NORMAL FLIGHT | NORMAL FLIGHT | NORMAL FLIGHT |
|---|---|---|---|
| FLIGHT STATE | FLIGHT AT OPERATION ALTITUDE | FLIGHT AT ALTITUDE LOWER THAN SAFE ALTITUDE (MORE THAN PREDETERMINED DISTANCE FROM LANDING POINT) | FLIGHT AT ALTITUDE LOWER THAN SAFE ALTITUDE (LESS THAN PREDETERMINED DISTANCE FROM LANDING POINT) |
| PRIORITY: HIGH | MANEUVERING SYSTEM POWER SYSTEM ENVIRONMENTAL SYSTEM | MANEUVERING SYSTEM POWER SYSTEM NAVIGATION SYSTEM | MANEUVERING SYSTEM POWER SYSTEM COMMUNICATION SYSTEM |
| PRIORITY: LOW | NAVIGATION SYSTEM COMMUNICATION SYSTEM MISSION SYSTEM | COMMUNICATION SYSTEM MISSION SYSTEM ENVIRONMENTAL SYSTEM | NAVIGATION SYSTEM MISSION SYSTEM ENVIRONMENTAL SYSTEM |

(56) References Cited

U.S. PATENT DOCUMENTS

2015/0073624 A1 3/2015 Takahashi et al.
2016/0308751 A1 10/2016 Rang et al.
2019/0041851 A1* 2/2019 Ortiz .................. G05D 1/104

FOREIGN PATENT DOCUMENTS

JP 5808781 B2 11/2015
JP 2016-208511 A 12/2016

* cited by examiner

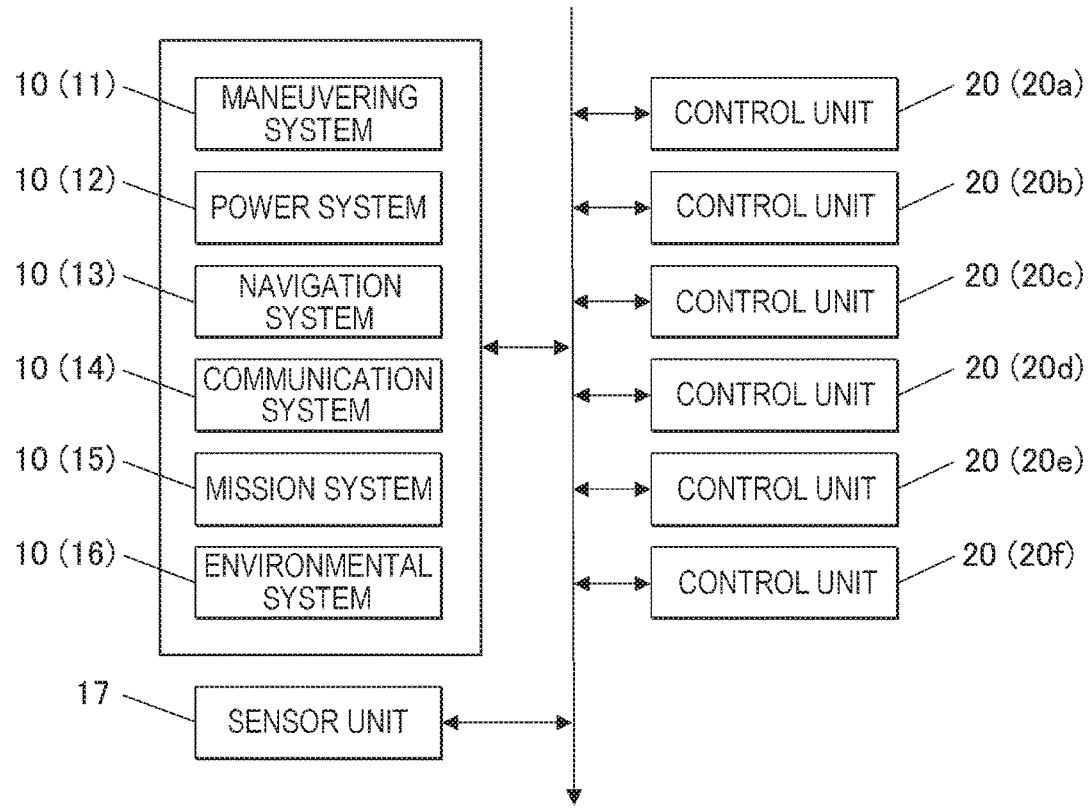

FIG. 3
| FLIGHT PURPOSE | MONITORING ACTIVITY | MONITORING ACTIVITY |
|---|---|---|
| FLIGHT STATE | DURING FLIGHT | AFTER LANDING |
| PRIORITY: HIGH | MANEUVERING SYSTEM<br>POWER SYSTEM | COMMUNICATION SYSTEM<br>MISSION SYSTEM |
| PRIORITY: LOW | COMMUNICATION SYSTEM<br>MISSION SYSTEM | MANEUVERING SYSTEM<br>POWER SYSTEM |
FIG. 4A
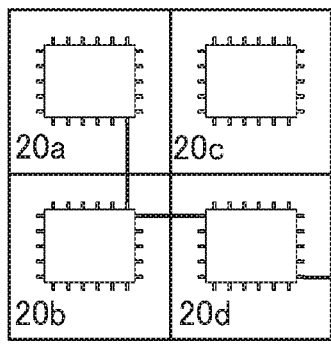
FIG. 4B
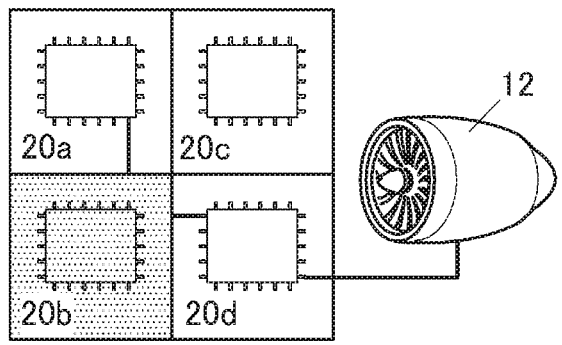
FIG. 4C
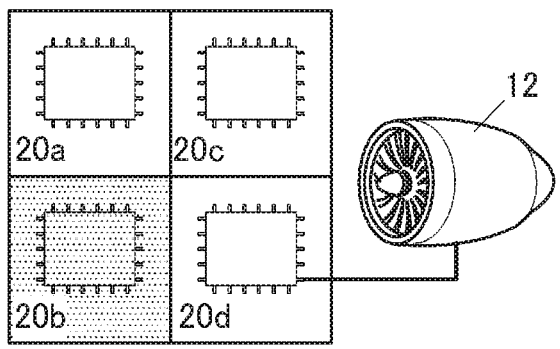
FIG. 4D
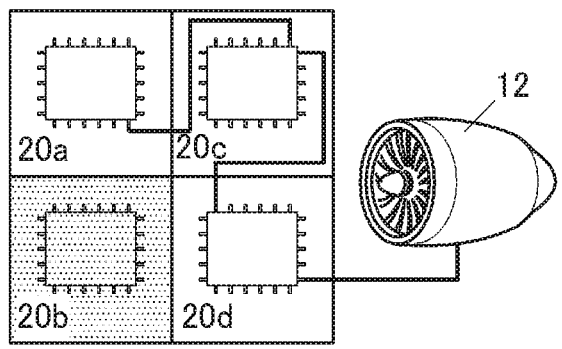

CONTROL SYSTEM FOR MOVABLE BODY, CONTROL METHOD FOR MOVABLE BODY, AND NON-TRANSITORY STORAGE MEDIUM

CROSS-REFERENCE TO RELATED APPLICATIONS

The present application claims priority from Japanese Patent Application No. 2018-063433 filed on Mar. 29, 2018, the entire contents of which are hereby incorporated by reference.

BACKGROUND

1. Technical Field

The present invention relates to a technique that controls various functions of a movable body, more particularly to a technique useful to make various functional systems of a movable body redundant preferably using a simplified structure.

2. Related Art

Modern aircrafts have special control devices (avionics) for controlling various functional systems such as a flight control system and a power control system.

Generally, an aircraft has a plurality of such control devices to make the hardware redundant (multiplexed). For instance, when each functional system has two control devices as illustrated in FIG. 5A, even if one control device malfunctions, the other control device sustains individual functions, as illustrated in FIG. 5B. This ensures the safety of an aircraft even if an unexpected device malfunction occurs.

Since the number of control devices installed increases depending on the degree of redundancy and the installation weight and cost increase in this structure, however, application to a small aircraft is particularly difficult.

Accordingly, in the technique described in, for instance, Japanese Patent (JP) No. 5808781, at least one flight controller is provided in the bodywork of an unmanned aircraft and at least one flight controller is also provided in a ground facility so that a functional shift to other flight controller including the flight controller of the ground facility is performed by the ground facility when an abnormality occurs in the flight controller of the aircraft. This technique can make the flight control function redundant while reducing the number of control devices installed in the bodywork.

SUMMARY OF THE INVENTION

An aspect of the present invention provides a control system for a movable body. The control system is mountable the movable body. The control system includes a plurality of controllers configured to control a plurality of functional systems of the movable body, and a detector configured to detect a movement situation of the movable body. Priorities corresponding to movement situations of the movable body are in advance assigned to each of the plurality of functional systems. When at least one of the plurality of controllers malfunctions, control resources of normal controllers, among the plurality of controllers, that do not malfunction are preferentially distributed to one or more of the functional systems having a high priority according to the movement situation of the movable body at that time.

An aspect of the present invention provides a control method for a movable body by a control system mountable the movable body. The control system includes a plurality of controllers configured to control a plurality of functional systems of the movable body. Each of the functional systems is in advance assigned with priorities corresponding to movement situations of the movable body. The control system includes a detector configured to detect a movement situation of the movable body. The method includes, in a case at least one of the plurality of controllers malfunctions, preferentially distributing control resources of normal controllers, among the plurality of controllers, which do not malfunction to one or more of the functional systems having a high priority according to the movement situation of the movable body at that time.

An aspect of the present invention provides a non-transitory storage medium that includes a control program for a movable body embodied therein. The movable body includes a control system. The control system includes a detector configured to detect a movement situation of the movable body and a plurality of controllers configured to control a plurality of functional systems of the movable body. Each of the functional systems is in advance assigned with priorities corresponding to movement situations of the movable body. The control program causes, when executed by the controllers, the controllers to implement a process. The process includes, in a case at least one of the plurality of controllers malfunctions, preferentially distributing control resources of normal controllers, among the plurality of controllers, which do not malfunction to one or more of the functional systems having a high priority according to the movement situation of the movable body at that time.

BRIEF DESCRIPTION OF THE DRAWINGS

FIG. 1 is a block diagram illustrating a schematic structure of a control system according to an example.

FIG. 2 illustrates the priorities of functional systems when the flight purpose is normal flight.

FIG. 3 illustrates the priorities of the functional systems when the flight purpose is monitoring activity.

FIGS. 4A to 4D illustrate instances of distribution of another control resource.

DETAILED DESCRIPTION

Figure 5A:
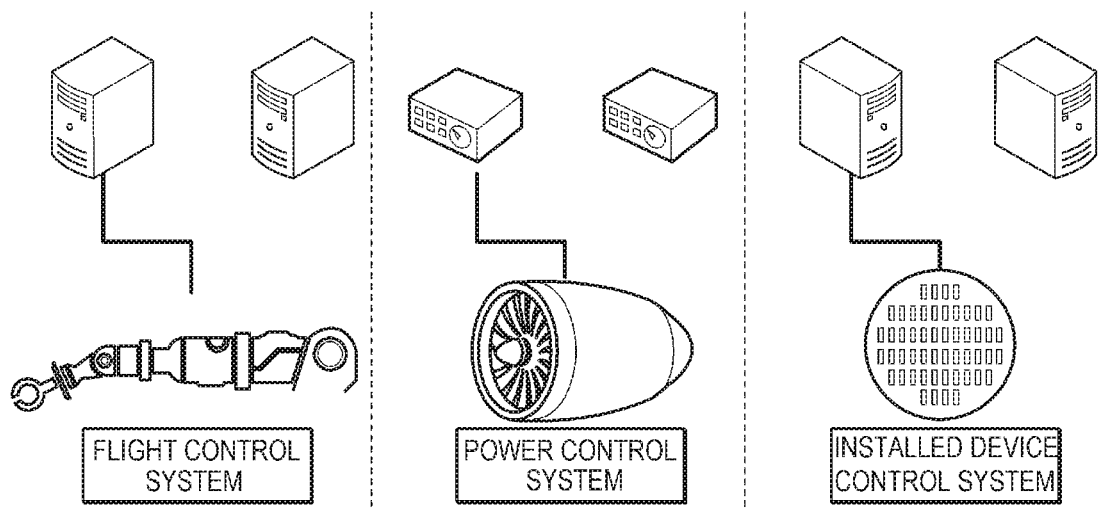
FIGS. 5A and 5B illustrate the redundancy of control devices in an aircraft of the related art.
Figure 5B:
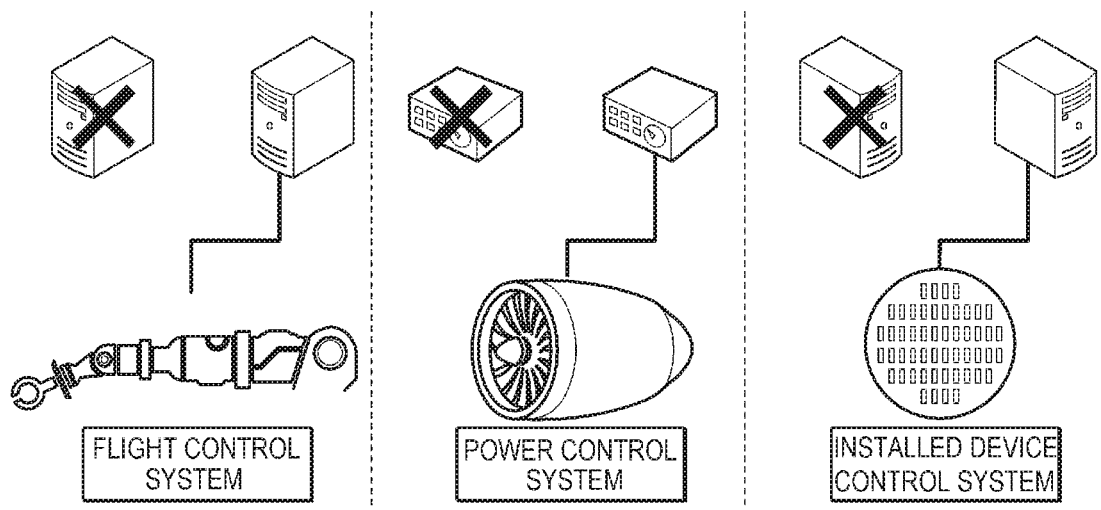

Application of a control system for a movable body according to an example of the present invention to an aircraft will be described with reference to the drawings.

In the technique described in JP No. 5808781, when the bodywork is controlled by a flight controller of a ground facility, since restriction of data amount or data delay may be caused in a data link between the bodywork and the ground facility, the bodywork may not be controlled at high accuracy.

It is desirable to make a plurality of functional systems of a movable body including an aircraft redundant preferably in a simplified structure that does not simply make hardware redundant (multiplexed), by using controllers in the movable body.

<Structure of Control System>

First, the structure of a control system installed in an aircraft 1 according to the example will be described.

FIG. 1 is a block diagram illustrating the schematic structure of this control system.

As illustrated in FIG. 1, the aircraft 1 has a plurality of functional systems 10 in which a plurality of installed devices is classified by function. The plurality of functional systems 10 according to the example includes a maneuvering system 11, a power system 12, a navigation system 13, a communication system 14, a mission system 15, and an environmental system 16.

The maneuvering system 11 includes a device concerning the steering control of a rudder surface and the like.

The power system 12 includes a device concerning the power control of an engine and the like.

The navigation system 13 includes a device concerning the calculation of a flight route.

The communication system 14 includes a device concerning the communication control of a radio device and the like.

The mission system 15 includes a device (such as, for instance, an optical sensor for monitoring) corresponding to the mission of the aircraft 1.

The environmental system 16 includes a device concerning in-flight air conditioning control.

In addition, priorities corresponding to flight situations (flight states and flight purposes) of the aircraft 1 are assigned to each of the plurality of functional systems 10 in advance.

In addition, the aircraft 1 has a sensor unit 17 including various sensors that detect the flight state of the aircraft 1 and the sensor unit 17 can detect the own aircraft position (including the longitude, the latitude, and the altitude) of the aircraft 1, the velocity and attitude of the aircraft, the wind power received by the bodywork, the wind direction, the weather, the barometric pressure, the temperature, the humidity, and the like around the bodywork.

It should be noted here that the sensor unit 17 may be provided in any of the functional systems 10 (for instance, a device that detects the position of own aircraft may be provided in the navigation system 13).

The control system of the aircraft 1 includes a plurality of control units 20 (20a to 20f) and the control units 20 control the plurality of functional systems 10 and the sensor unit 17. The control system according to the example includes the plurality of control units 20 and the sensor unit 17.

The plurality of control units 20 correspond to the plurality of functional systems 10 and, in the example, associated with the plurality of functional systems 10 so as to control the plurality of functional systems 10 separately in the normal state (normal state in which the control units 20 operate soundly without malfunctioning).

Each of the control units 20 is a computer including a central processing unit (CPU), a memory (storage device), and the like and has a hardware specification such as, for instance, the processing capacity corresponding to the control load in the normal state. In addition, each of the control units 20 has a plurality of pieces of software and logic circuit structural information for a field-programmable gate array (FPGA) or the like so as to be able to become a common platform with the other control units 20 and control the plurality of functional systems 10 (all functional systems 10 in the example). In addition, the control units 20 stores a program that executes the operational processing of the control system described later. Information of the priorities of the functional systems 10 described above is built into this program.

In addition, the priorities as the main unit are assigned to the plurality of control units 20 in the order of, for instance, the alphabetic character at the end of the symbol and, in the normal state, the control unit 20a monitors the other control units 20 as the main unit. When the control unit 20 that is the main unit malfunctions, the function of the main unit is inherited to the control unit 20 having the next higher priority. In the present example, the control unit 20 that is the main unit detects the flight state of the aircraft 1 including a malfunction of the control units 20, makes various decisions, and calculates and distributes the control resources of the control units 20, which will be described later. However, the operational situations (information about normal operation, the control unit 20 controlling each of the functional systems, and the like) of the control units 20 can be mutually recognized by the plurality of control units 20.

<Operation of Control System>

In the control system of the aircraft 1, when any of the control units 20 malfunctions and the control system becomes short of control resources to control all the functional systems 10, the functional systems 10 having a high priority are selected according to the "flight situation (flight state and flight purpose)" of the aircraft 1 at that time and the control resources of the normal control units 20 that function soundly are preferentially distributed to control of the selected functional systems 10.

The "control resource" in the example includes the area (almost same as the number of semiconductors) of the logic circuit of an FPGA in addition to logical capability such as the processing capability of a CPU and a memory amount or the like.

A specific instance of distributing the control resource will be described.

[Selection of Functions According to Flight State]

When any of the control units 20 malfunctions and the control resource is reduced during normal flight of the aircraft 1, the functional systems 10 corresponding to the "flight state" of the aircraft 1 are selected so that the aircraft 1 can continue flight safely and land on the nearest airport (or a place on which landing is allowed). Here, the "normal flight" represents the flight whose flight purpose is "travel to a predetermined destination", "flight in a predetermined airspace (or a flight route)", or the like. The flight purpose in this case is referred to as the "normal flight". It should be noted here that the flight purpose is set based on the vehicle type of the aircraft 1 or set in advance before flight in the control units 20. When the flight purpose is normal flight, the control unit 20 that is the main unit selects the functional systems 10 corresponding to the flight state.

Specifically, as illustrated in FIG. 2, during flight at the operation altitude of the aircraft 1 (or the altitude at which the in-flight environment of occupants needs to be kept), the maneuvering system 11 and the power system 12 that are necessary for flight continuation of the aircraft 1 and the environmental system 16 that is necessary for protecting occupants by keeping the in-flight environment are given the high priority and the other functional systems 10 (the navigation system 13, the communication system 14, and the mission system 15) are given a low priority.

Therefore, when the control resources of the control units 20 are reduced at this time, the control resources of the normal control units 20 are preferentially distributed to the maneuvering system 11, the power system 12, and the environmental system 16 and the sustainment of the functions of these functional systems 10 takes precedence. No control resources are distributed (the functions stop) or only the restricted control resources are distributed to the other functional systems 10.

More specifically, when the control unit 20 that is the main unit detects a malfunction of any of the control units 20, the control unit 20 detects the flight state of the aircraft 1 using the sensor unit 17 and calculates the remaining control resource by subtracting the control resource of the control unit 20 having malfunctioned from all of the control resources in the normal state. Then, the remaining control resources are preferentially distributed to the functional systems 10 having the high priority with reference to the above priorities assigned to the functional systems 10 according to the detected flight state (that is, flight at the operation altitude). It should be noted here that, when the remaining control resources are sufficient for controlling all of the functional systems 10, the control unit 20 having a margin of the control resource may control the functional system 10 controlled by the control unit 20 having malfunctioned.

The control unit 20 that is the main unit continues the flight of the aircraft 1 in this state and descends the aircraft 1 to an altitude (for instance, 10,000 feet) at which the in-flight environment of occupants does not need to be kept.

During flight at a safe altitude, the maneuvering system 11, the power system 12, and the navigation system 13 that sets, for instance, a flight route to a landing point such as the nearest airport or the like are given the high priority and the other functional systems 10 (the communication system 14, the mission system 15, and the environmental system 16) are given the low priority.

Therefore, when the aircraft 1 descends to a safe altitude, the control resources of the normal control units 20 are distributed newly to the navigation system 13 in addition to the maneuvering system 11 and the power system 12 and the control resources are no longer distributed to the environmental system 16 (or only the restricted control resources are distributed).

More specifically, the control unit 20 that is the main unit detects the flight state (that is, flight at a safe altitude outside a predetermined distance range from the landing point) of the aircraft 1 using the sensor unit 17 and preferentially distributes the remaining control resources to the functional systems 10 having the high priority with reference to the above priorities assigned to the functional systems 10 according to this flight state.

The control unit 20 that is the main unit continues the flight of the aircraft 1 in this state and flies toward the landing point following a flight route setting made by the navigation system 13.

For instance, in the flight that has reached a point within a predetermined distance range from which the landing point can be seen while approaching the landing point, the maneuvering system 11, the power system 12, and the communication system 14 necessary for communicating with a ground facility (for instance, an airport traffic control) are given the high priority and the other functional systems 10 (the navigation system 13, the mission system 15, and the environmental system 16) are given the low priority.

Therefore, when the aircraft 1 approaches the landing point, the control resources of the normal control units 20 are distributed newly to the communication system 14 in addition to the maneuvering system 11 and the power system 12 and the control resources are no longer distributed to the navigation system 13 (or only the restricted control resources are distributed).

More specifically, the control unit 20 that is the main unit detects the flight state (that is, flight at a safe altitude within a predetermined distance range from the landing point) of the aircraft 1 using the sensor unit 17 and preferentially distributes the remaining control resources to the functional systems 10 having the high priority with reference to the above priorities assigned to the functional systems 10 according to this flight state.

Then, the control unit 20 that is the main unit communicates with, for instance, the airport traffic control using the communication system 14 and lands the aircraft 1 on the landing point such as an airport or the like.

As described above, when the control unit 20 malfunctions during normal flight of the aircraft 1, the control unit 20 that is the main unit detects the flight state of the aircraft 1 at any time and preferentially distributes the remaining control resources to the functional systems 10 having the high priority according to this flight state. In such a case, the maneuvering system 11 and the power system 12 that are essential to flight continuation are always given the high priority regardless of the flight state of the aircraft 1. In other cases, the functional systems 10 that need to function according to the flight state are given the high priority. Therefore, even when any of the control units 20 malfunctions and the control resources are insufficient, the aircraft 1 can fly safely to and land on the landing point.

[Selection of Functions according to Flight Purpose]

In the case of a particular "flight purpose (mission)", the flight purpose takes precedence over the flight continuation of the aircraft 1 and the functional systems 10 are selected. This flight purpose is set for the control units 20 based on the vehicle type of the aircraft 1, in advance before flight, or by switching mode from a ground station during flight.

For instance, when the aircraft 1 is a relatively inexpensive unmanned aircraft and the flight purpose is "monitoring activity" for monitoring a particular target, since human damage is not present and the lost cost due to damage of the bodywork is low, the mission may take precedence over the continuation of flight.

Specifically, as illustrated in FIG. 3, when the aircraft 1 that is the unmanned aircraft flies in a mission destination, the maneuvering system 11 and the power system 12 are given the high priority until the aircraft 1 makes emergency landing after that and the communication system 14 and the mission system 15, which are the other systems, are given the low priority. Then, after the aircraft 1 makes emergency landing (or landing) in the mission destination, the mission system 15 for monitoring activity and the communication system 14 for communication with the ground station are given the high priority and the maneuvering system 11 and the power system 12 are given the low priority. It should be noted here that the navigation system 13 and the environmental system 16 are not necessary since the aircraft 1 is an unmanned aircraft in this instance.

Therefore, when the control unit 20 that is the main unit detects a malfunction in any of the control units 20 during flight of the aircraft 1 in the mission destination, the control unit 20 detects the flight state of the aircraft 1 using the sensor unit 17 and calculates the remaining control resources. Then, according to the detected flight state (that is, flight in the mission destination), the remaining control resource is preferentially distributed to the maneuvering system 11 and the power system 12 and the control resources are not distributed or only the restricted control resources are distributed to the other functional systems 10. The control unit 20 that is the main unit continues the flight of the aircraft 1 in this state and causes the aircraft 1 to immediately make emergency landing (or landing).

After that, when the control unit 20 that is the main unit detects emergency landing of the aircraft 1 using the sensor unit 17, the control unit 20 preferentially distributes the remaining control resources to the communication system 14 and the mission system 15 and does not distribute the control resources to the other functional systems 10. Then, the control unit 20 that is the main unit monitors the monitoring target by operating the mission system 15 and continues monitoring activity by transmitting the information (for instance, image information) thereof to the ground station using the communication system 14.

[Low Level Execution of Functions]

When the control unit 20 malfunctions severely and the amount of reduction in the control resource is large, only the minimum processing required to achieve the flight purpose among the functional systems 10 having the high priority can be selected to perform the processing.

For instance, when the control unit 20 malfunctions during normal flight of the aircraft 1, the control resource is significantly reduced, and the maneuvering system 11 and the power system 12 that are essential to flight continuation cannot be controlled completely, the number of engines controlled by the power system 12 is reduced and the frequency at which steering is performed by the maneuvering system 11 is reduced (for instance, a half frequency) based on the remaining amount of the control resources. Of course, the other functional systems 10 need to be stopped.

Therefore, the control unit 20 can continue stable flight even incompletely and land the aircraft 1 on a safe place on which landing is allowed.

[Instance of Distributing Another Control Resource]

The case in which communication circuits of the plurality of control units 20 that control the functional systems 10 are distributed as the control resources will be described.

The case in which the control unit 20a controls the power system 12 via a communication circuit passing through the other control units 20b and 20d in this order as illustrated in FIG. 4A will be considered below.

In this case, if the control unit 20b malfunctions as illustrated in FIG. 4B, the route from the control unit 20a to the power system 12 is interrupted.

In this case, the control unit 20d may singly control the power system 12 as illustrated in FIG. 4C.

Alternatively, when the control unit 20d has difficulty in singly controlling this system, the communication circuit may be reconfigured so as to start from the control unit 20a, pass through the control units 20c and 20d in this order, and reach the power system 12, as illustrated in FIG. 4D.

As described above, the control resources in the example include the physical hardware structure of a control communication circuit including control logic.

<Effects>

As described above, according to the example, if at least one of the plurality of control units 20 that controls the plurality of functional systems 10 of the aircraft 1 malfunctions, the control resources of the normal control units 20 that do not malfunction are preferentially distributed to one or more of the functional systems 10 that have the high priority according to the flight situation of the aircraft 1 at this time.

This sustains the functions having the high priority according to the flight situation of the aircraft 1 at that time even when the control unit 20 malfunctions and all of the plurality of functional systems 10 cannot be controlled.

Accordingly, the plurality of functional systems 10 of the aircraft 1 can be made redundant preferably in a simplified structure that does not simply make hardware redundant, by using the control unit 20 in the aircraft.

In addition, when the flight purpose of the aircraft 1 is normal flight, the maneuvering system 11 and the power system 12 that are essential to flight continuation of the aircraft 1 among the plurality of functional systems 10 are given the high priority regardless of the flight state of the aircraft 1.

This can improve the flight continuity of the aircraft 1 and thereby improve the safety of the aircraft 1.

In addition, when the aircraft 1 is an unmanned aircraft and the flight purpose is monitoring activity, the maneuvering system 11 and the power system 12 that are essential to flight continuation of the aircraft 1 among the plurality of functional systems 10 are given the high priority when the aircraft 1 is flying and the mission system 15 and the communication system 14 are given the high priority after the aircraft 1 lands.

Therefore, when monitoring activity takes precedence over the flight continuation of the aircraft 1, obtained information can be transmitted by giving a higher priority to monitoring activity.

In addition, when the amount of reduction in the control resource due to a malfunction of the control unit 20 is too large to completely control the maneuvering system 11 and the power system 12, control is made in a state in which the number of engines controlled by the power system 12 is reduced and the frequency at which steering is performed by the maneuvering system 11 is reduced based on an remaining amount of the control resources.

Even when the amount of reduction in the control resource is large, this can continue the flight of the aircraft 1 stably even incompletely and thereby improve the safety of the aircraft 1.

MODIFIED EXAMPLES

It should be noted here that example to which the present invention is applicable is not limited to the example described above and the example can be modified as appropriate without departing from the spirit of the invention.

For instance, the plurality of functional systems 10 is not limited to the six types in the above example and only some of the six types of functional systems 10 may be the targets to which the example of the present invention is applied or other types (for instance, a function selected only in a particular situation, a programs required only during occurrence of a malfunction, and the like) may be added. In addition, the functional systems 10 may be further divided into subsystems.

In addition, the plurality of control units 20 only needs to distribute the control resources and control the plurality of functional systems 10 as a whole and the number and the hardware specifications of the control units 20 are not particularly limited.

In addition, the plurality of control units 20 may include a backup unit that does not control any of the functional systems 10 in the normal state. In this case, when any of the control units 20 malfunctions, the control resource of the control unit 20 that is the backup unit is used preferentially. In addition, this backup unit may always back up the control unit 20 that is the main unit.

In addition, the priorities assigned to the functional systems 10 are not limited to those described in the example described above and all of the functional systems 10 may be given different priorities or subdivided priorities may be set, for instance, for each of devices in the functional systems 10.

In addition, although the control system for the movable body according to the example of the present invention has been applied to a movable body, the movable body to which the example of the present invention is applicable is not limited to an aircraft and the movable body may be a ship, a vehicle, or the like.

The invention claimed is:

1. A control device for a movable body, the control device being mountable on the movable body, the control device comprising:
   a plurality of controller devices configured to control a plurality of functional systems of the movable body; and
   a detector device configured to detect a movement situation of the movable body, wherein priorities corresponding to movement situations of the movable body are in advance assigned to each of the plurality of functional systems, and
   in a case at least one of the plurality of controller devices malfunctions, control resources of normal controller devices, among the plurality of controller devices, which do not malfunction are preferentially distributed to one or more of the functional systems having a high priority according to the movement situation of the movable body at that time,
   wherein in a case where the movable body is an aircraft and a flight purpose of the aircraft is normal flight, a maneuvering system and a power system that are essential to flight continuation of the aircraft among the plurality of functional systems are given the high priority regardless of a flight state of the aircraft, and
   wherein in a case where an amount of reduction in the control resources due to the malfunction of the at least one of the controller devices results in inability to control the maneuvering system and the power system, control is performed by reducing the number of engines controlled by the power system and reducing a frequency at which steering is performed by the maneuvering system based on a remaining amount of the control resources.

2. The control system for a movable body according to claim 1, wherein
   in a case where the movable body is an unmanned aircraft and a flight purpose of the unmanned aircraft is monitoring activity,
   the maneuvering system and the power system that are essential to flight continuation of the unmanned aircraft among the plurality of functional systems are given the high priority, during the flight of the unmanned aircraft, and
   a mission device configured to perform the monitoring activity and a communication device configured to transmit obtained information among the plurality of functional systems are given the high priority after the unmanned aircraft lands.

3. The control system for a movable body according to claim 1, wherein
   in a case where the movable body is an unmanned aircraft and a flight purpose of the unmanned aircraft is monitoring activity,
   the maneuvering system and the power system that are essential to flight continuation of the unmanned aircraft among the plurality of functional systems are given the high priority, during the flight of the unmanned aircraft, and
   a mission device configured to perform the monitoring activity and a communication device configured to transmit obtained information among the plurality of functional systems are given the high priority after the unmanned aircraft lands.

4. The control system for a movable body according to claim 1, wherein
   the plurality of controller devices comprise a backup controller device configured to control none of the functional systems in a normal state, and
   when the at least one of the plurality of controller devices malfunctions, a control resource of the backup controller devices is preferentially used.

5. The control system for a movable body according to claim 1, wherein
   the plurality of controller devices comprise a backup controller devices configured to control none of the functional systems in a normal state, and
   when the at least one of the plurality of controller devices malfunctions, a control resource of the backup controller devices is preferentially used.

6. A control device for a movable body, the control device being mountable on the movable body, the control device comprising:
   a plurality of controller devices configured to control a plurality of functional systems of the movable body; and
   a detector device configured to detect a movement situation of the movable body, wherein priorities corresponding to movement situations of the movable body are in advance assigned to each of the plurality of functional systems, and
   in a case at least one of the plurality of controller devices malfunctions, control resources of normal controller devices, among the plurality of controller devices, which do not malfunction are preferentially distributed to one or more of the functional systems having a high priority according to the movement situation of the movable body at that time, wherein
   in a case where the movable body is an unmanned aircraft and a flight purpose of the unmanned aircraft is monitoring activity,
   a maneuvering system and a power system that are essential to flight continuation of the unmanned aircraft among the plurality of functional systems are given the high priority, during the flight of the unmanned aircraft, and
   a mission device configured to perform the monitoring activity and a communication device configured to transmit obtained information among the plurality of functional systems are given the high priority after the unmanned aircraft lands.

7. A control method for a movable body by a control system mountable the movable body, the control system comprising
   a plurality of controller devices configured to control a plurality of functional systems of the movable body, each of the functional systems being in advance assigned with priorities corresponding to movement situations of the movable body, and
   a detector device configured to detect a movement situation of the movable body,
   the method comprising:
   in a case at least one of the plurality of controller devices malfunctions, preferentially distributing control resources of normal controller devices, among the plurality of controller devices, which do not malfunction to one or more of the functional systems having a high priority according to the movement situation of the movable body at that time,
   wherein in a case where the movable body is an aircraft and a flight purpose of the aircraft is normal flight, a maneuvering system and a power system that are essential to flight continuation of the aircraft among the plurality of functional systems are given the high priority regardless of a flight state of the aircraft, and wherein in a case where an amount of reduction in the control resources due to the malfunction of the at least one of the controller devices results in inability to control the maneuvering system and the power system, control is performed by reducing the number of engines controlled by the power system and reducing a frequency at which steering is performed by the maneuvering system based on a remaining amount of the control resources.

8. A non-transitory storage medium that includes a control program for a movable body embodied therein, the movable body comprising a control system comprising a detector device configured to detect a movement situation of the movable body and a plurality of controller devices configured to control a plurality of functional systems of the movable body, each of the functional systems being in advance assigned with priorities corresponding to movement situations of the movable body, the control program causing, when executed by the controller devices, the controller devices to implement a process, the process comprising:

in a case at least one of the plurality of controller devices malfunctions, preferentially distributing control resources of normal controller devices, among the plurality of controller devices, which do not malfunction to one or more of the functional systems having a high priority according to the movement situation of the movable body at that time, wherein in a case where the movable body is an aircraft and a flight purpose of the aircraft is normal flight, a maneuvering system and a power system that are essential to flight continuation of the aircraft among the plurality of functional systems are given the high priority regardless of a flight state of the aircraft, and wherein in a case where an amount of reduction in the control resources due to the malfunction of the at least one of the controller devices results in inability to control the maneuvering system and the power system, control is performed by reducing the number of engines controlled by the power system and reducing a frequency at which steering is performed by the maneuvering system based on a remaining amount of the control resources.

\* \* \* \* \*